United States Patent
Christie

(10) Patent No.: US 9,206,937 B2
(45) Date of Patent: Dec. 8, 2015

(54) SYSTEM AND DEVICE FOR MONITORING A MOVABLE PLUG ELEMENT(S) IN A PIPELINE

(75) Inventor: Paul J. H. Christie, Aberdeen (GB)

(73) Assignee: TDW Offshore Services SA, Stavanger (NO)

( * ) Notice: Subject to any disclaimer, the term of this patent is extended or adjusted under 35 U.S.C. 154(b) by 172 days.

(21) Appl. No.: 13/264,083

(22) PCT Filed: Apr. 16, 2010

(86) PCT No.: PCT/NO2010/000141
§ 371 (c)(1),
(2), (4) Date: Nov. 10, 2011

(87) PCT Pub. No.: WO2010/120189
PCT Pub. Date: Oct. 21, 2010

(65) Prior Publication Data
US 2012/0118085 A1    May 17, 2012

(30) Foreign Application Priority Data
Apr. 17, 2009 (NO) .................................. 20091479

(51) Int. Cl.
*G01N 33/00* (2006.01)
*F16L 55/26* (2006.01)

(52) U.S. Cl.
CPC ..................................... *F16L 55/26* (2013.01)

(58) Field of Classification Search
CPC .............................. G01N 33/00; F16L 55/26
USPC ............ 73/37, 152.01, 865.8, 40.5 R, 152.51
See application file for complete search history.

(56) References Cited

U.S. PATENT DOCUMENTS

| 3,691,819 A | 9/1972 | Guest |
|---|---|---|
| 3,837,214 A | 9/1974 | Guest |

(Continued)

FOREIGN PATENT DOCUMENTS

| WO | WO 99/25070 A2 | 5/1999 |
|---|---|---|
| WO | WO 03/067134 A2 | 8/2003 |
| WO | WO2008/079016 | 7/2008 |

OTHER PUBLICATIONS

Pipeline Research Limited (http://www.pipeline-research.com/VelCtrl.html and http://www.pipeline-research.com/HighFrict.html, both accessed Dec. 16, 2006).*

(Continued)

*Primary Examiner* — Peter Macchiarolo
*Assistant Examiner* — Alexander Mercado
(74) *Attorney, Agent, or Firm* — Gable Gotwals

(57) ABSTRACT

A friction pig 2 and system for monitoring one or more physical properties upstream and/or downstream of the friction pig 2 when in use in a pipe 1 is disclosed. The friction pig comprises at least one sensor 7 connected to the friction pig 2 for sensing and acquiring data related to one or more physical properties concerning the friction pig 2 or fluid upstream and/or downstream of the friction pig 2; means for receiving instructions from a remote control unit 12; means for carrying out instructions; and means for transmitting the acquired data to the remote control unit 12, thus enabling monitoring of one or more physical properties. Friction pigs preferably comprise friction plugs, for example high-friction plugs, for use in pipeline isolation. The invention is also described by a system comprising at least two friction pigs 2, 4 for measuring one or more physical properties when used in a pipe.

11 Claims, 2 Drawing Sheets

(56) References Cited

U.S. PATENT DOCUMENTS

| | | | |
|---|---|---|---|
| 4,747,317 A * | 5/1988 | Lara | 73/865.8 |
| 7,421,894 B2 * | 9/2008 | Keep et al. | 73/170.19 |
| 2002/0011124 A1 * | 1/2002 | Phipps | 73/865.8 |
| 2004/0134289 A1 * | 7/2004 | Savard | 73/865.8 |
| 2004/0261547 A1 * | 12/2004 | Russell et al. | 73/865.8 |
| 2005/0005716 A1 * | 1/2005 | Harris | 73/865.8 |
| 2006/0248966 A1 * | 11/2006 | Houldey et al. | 73/865.8 |
| 2006/0288802 A1 * | 12/2006 | Germata | 73/865.8 |
| 2009/0078283 A1 * | 3/2009 | Phipps | 134/8 |
| 2009/0140133 A1 * | 6/2009 | Abney | 250/253 |

OTHER PUBLICATIONS

"Use of SmartPlugs to Isolate Operating Pipelines for Contruction and Maintenance Activity", Rolf Gunnar Lie and Mark Sim, Mar. 30, 2009, XP-002609505, PetroMin Pipeliner.

* cited by examiner

SYSTEM AND DEVICE FOR MONITORING A MOVABLE PLUG ELEMENT(S) IN A PIPELINE

CROSS-REFERENCE TO RELATED APPLICATIONS

This application is the United States National Phase of PCT Patent Application No. NO2010/00141 filed on 16 Apr. 2010, which was published in English on 21 Oct. 2010 under Publication No. WO 2010/120189A2, which claims priority to Norwegian Patent Application No. 20091479 filed 17 Apr. 2009, both of which are incorporated herein by reference.

FIELD OF THE INVENTION

The invention concerns friction pigs for isolating selected parts of a pipeline. More specifically, the invention relates to a system and device for of monitoring movable plug elements in a pipeline.

BACKGROUND OF THE INVENTION

It is often desirable or necessary to temporary isolate selected sections of a pipeline while the pipeline system is in operation, when performing maintenance, branching, repair, etc. Such isolation is commonly performed by plugs which are positioned and set at the desired location, allowing downstream operations to continue unimpeded. Using a plug which is inserted into the pipeline, guided to the desired location and then set, is a procedure which is cost effective, flexible and possible in most pipeline configurations.

The plugs may be run into the pipeline with an umbilical or be autonomous plugs that are pigged and/or moved by tractor units within the pipeline. An autonomous plug may for instance be used in long subsea pipelines for sealing these off at the desired site, and thereafter removed from the pipeline when the work is has been completed. Some plugs are set by extending slips into contact with the pipe wall and forcing a sealing element against the pipe wall. Some plugs are designed to self-lock into the set positions as long as there is a pressure difference across the plug. One example of an autonomous plug is disclosed in WO 2008079016.

Plugs of this type, which may be manipulated between set and unset states, are suitable for applications where the pressure differences across the plug are comparably high, for example up to about 150 bar.

In applications where the pressure differences are comparably low—for example around 5 bar, it is often more convenient to use friction pigs (also referred to as "high-friction pigs") for pipeline isolation. Friction pigs are normally pigged to the desired location, whereupon the differential pressure is removed, allowing the friction pig to come to rest in the pipeline. These types of pigs have typically no moving parts, but their sealing elements comprise a resilient material with certain stiffness. One example of a suitable resilient material is polyurethane. The sealing function of a friction pig thus relies entirely on the friction between the pipeline wall and the pig material.

It is well known in the art to provide a friction pig with a transponder in order to track its travel through a pipeline. One such tracking system is the SMARTTRACK™ tracking system (TDW Delaware, Inc.), developed by the present applicant. This system allows two-way electromagnetic communication between the transponder mounted on the pig (or a plug) and a transceiver outside the pipeline. Each transponder is given a unique identification number, which is communicated to the transceiver and, if required, further to a control unit (a PC or similar). Thus, when the transponder is in an active mode, it sends an electromagnetic signal, enabling an operator using the transceiver to track the pig's travel through the pipeline, and e.g. to determine when the pig has reached a pre-determined location in the pipeline.

As described above, once a friction pig has been placed at its intended position in order to isolate a section of a pipeline, its sealing function relies entirely on the friction between the pipeline wall and the pig material. A pig of this type has no inherent fail-safe properties. An operator performing work on the isolated section of the pipeline must have confidence in the pig's sealing capabilities, and it is therefore of great importance that there are no leaks from one side of the pig to the other and that the pig remains more or less stationary at the intended position.

It is therefore a need for a system and a method of monitoring such pig.

SUMMARY OF THE INVENTION

The present invention provides a friction pig for monitoring one or more physical properties upstream and/or downstream of the friction pig when in use in a pipe, comprising:
  at least one sensor connected to the friction pig for sensing and acquiring data related to one or more physical properties concerning the friction pig or fluid upstream and/or downstream of the friction pig;
  a transponder for receiving instructions from a remote control unit through a transceiver, said instructions comprises operation modes of the friction pig;
  means for carrying out said instructions, and
  means for transmitting said acquired data to said remote control unit through said transceiver, thus enabling monitoring of one or more physical properties.

The invention also comprises a system for monitoring one or more physical properties upstream and/or downstream of a plurality of friction pigs when in use in a pipe, where the system comprises:
  two or more mutually independent friction pigs, comprising each at least one sensor connected to each friction pig for sensing and acquiring data related to one or more physical properties concerning the friction pigs or fluid upstream and/or downstream of the friction pigs,
  means in at least one friction pig for receiving and carrying out instructions from a control unit through a transceiver outside the pipe, said instructions comprise operation modes of the friction pigs,
  means in at least one friction pig for transmitting said acquired data to said remote control unit through said transceiver;
  transceiver for receiving instructions from a remote control unit, said instructions comprises operation modes of the friction pigs, and
  a control unit for sending instructions to said friction pigs, and for receiving data from said friction pigs for monitoring one or more physical properties upstream and downstream of said plurality of friction pigs used in a pipe.

The invention is set forth and characterized in the main claims, while the dependant claims describe other characteristics of the invention.

BRIEF DESCRIPTION OF THE DRAWINGS

These and other characteristics of the invention will be clear from the following description of an embodiment of the invention, given as a non-restrictive example, with reference to the attached drawings wherein like components have been give like reference numerals and where.

DETAILED DESCRIPTION OF AN EMBODIMENT OF THE INVENTION

Figure 1:
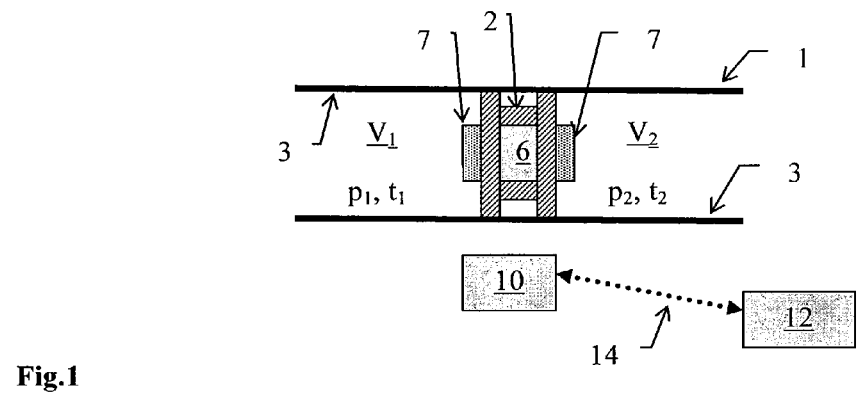
FIG. 1 is a schematic drawing illustrating a first embodiment of the system according to the invention.

With reference to the attached drawings, FIG. 1 is a schematic illustration of an embodiment of the system according to the invention. A plug element, in this embodiment a friction pig 2, is shown in place at a location inside a pipeline 1 having an internal wall 3. A transponder 6 is fitted to the pig 2 and connected to sensors 7, of which one sensor is exposed to a first portion or volume of the pipeline, designated by the reference numeral $V_1$, and another sensor is exposed to a second portion or volume of the pipeline, designated by the reference numeral $V_2$. Although the figures show two sensors 7, one on each side of the pig, it is of course conceivable to have only one sensor, as well as more sensors, depending on the requirements of the applicable situation. The sensor(s) 7 is (are) connected to the transponder 6 in a manner known in the art and will therefore not be discussed here.

FIG. 1 also show a transceiver 10 located on the outside of the pipeline and connected via a data transfer link 14 to a control and monitoring unit 12. In a practical application, it may be advantageous to use a plurality of transceivers 10.

The data transfer link 14 may be by means of a cable or wireless communication, or, in subsea applications, by means of acoustic modems. The control and monitoring unit 12 is typically a PC placed in a remote location (e.g. on a surface vessel) and having the required software for controlling the transponders 6. These equipment units are well known within the art, and will therefore not be discussed further.

The skilled person is also familiar with how the equipment illustrated in FIG. 1 is used to track the motion of a pig within the pipeline, either through the pipeline in a pigging operation, or to a desired location in the pipeline where the plug is to be brought to rest in order to perform its isolation operation. In use for that purpose, the transponder 6 emits a signal at regular intervals which is detected by the transceivers 10. This signal is often referred to as a "ping", as it is simply a signal announcing the plug's presence to listening transceiver. The "ping" signal may contain a unique identifier for its transponder; this allows for simultaneous tracking of several plugs.

Figure 3:
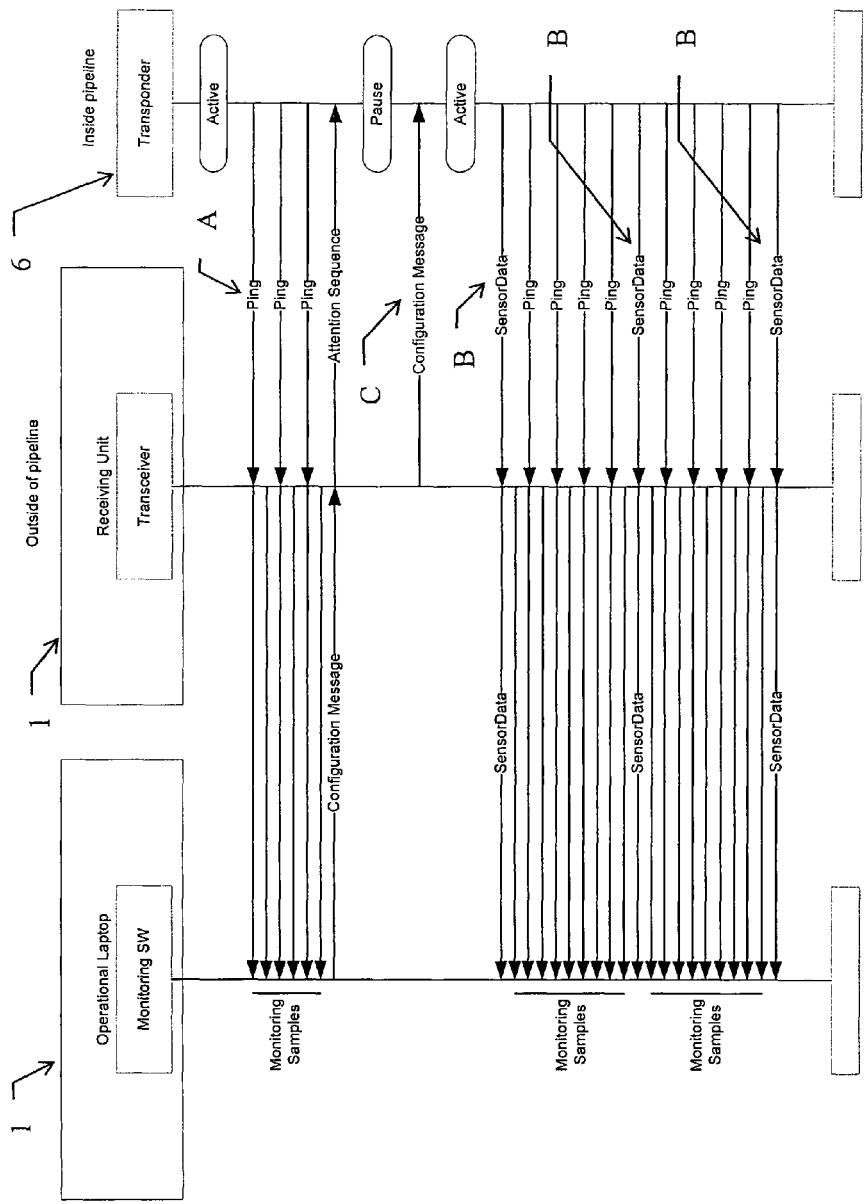
FIG. 3 is a diagram illustrating a typical data flow when using an embodiment of the system according to the invention.

Turning now to FIG. 3, that diagram illustrates an example of data flow between a transponder 6 inside the pipeline, a transceiver 10 outside the pipeline, and a control and monitoring unit 12. Starting in the top right-hand corner of the diagram, the transponder 6 is in an active mode and emits a tracking signal, or "ping" signal, A at regular intervals. The tracking signal A may contain a unique identifier for the transponder and enables an operator to trace the motion of the pig through the pipeline. The tracking signals A are detected by the transceiver 10 in a manner which is known in the art. The motion of the pig 2 within the pipeline 1 is thus monitored, for example by the software within the control unit 12 (identified in FIG. 3 as "Operational Laptop").

When the plug has reached a predetermined location, and/or an operator makes a decision to make the pig come to rest in the pipeline, a Configuration Message or instruction C is sent by the control unit 12 to the transceiver 10, which forwards the instruction to the transponder 6. The instruction C typically comprises instructions as to the type of data from the sensor 7 which are to be returned from the transponder 6, and at what intervals.

Upon receipt of the instruction C, the transponder 6 starts sending the specified sensor data B at the pre-determined intervals. Typically, the sensor data B are data from one or more of the sensors 7 connected to the transponder 6, the data typically comprising pressure, temperature, volume, position, odometer reading, acceleration or gas detection.

FIG. 3 shows how the sensor data signals B are sent from the transponder 6 at certain intervals. The figure also shows that the tracking signal A continues to be sent during these intervals. However, any combination of the transmission of these signal are possible. For example, although not shown on FIG. 3, the sensor data B may be sent at the same intervals as the tracing signal A. The sensor data B and the tracking signal A may be sent at regular intervals or continuously.

The friction pig 2 thus has means for operating in different operation modes where a first is a communication mode and a second is a tracking mode. The communication mode enables said means for acquiring data related to one or more physical properties concerning the friction pig 2, and the tracking mode enables means for sending signals related to the position of the friction pig 2.

The friction pig 2 can continuously switch between the modes, thus enabling position tracking and e.g. pressure monitoring at the same time. It is then possible to track position, and also to predict if the friction pig 2 will start to move after standstill due to the monitoring of the pressure difference upstream and downstream of the friction pig 2.

Returning now to FIG. 1, the data flow described above with reference to FIG. 3, is illustrated as being used to monitor physical parameters around a pig 2 in a pipeline 1. These parameters are measured by sensors 7, which are known in the art, connected to the transponder 6. The pig is in a substantially stationary state, its sealing elements sealing against the inner wall 3 of the pipeline, and being subjected to a first pressure $p_1$ in a pressurised volume $V_1$ on a first side of the pig, and a non-pressurised volume $V_2$ on a second side of the pig. Typically, the first pressure $p_1$ is on the order of 5 bars for a low-pressure application. The second pressure $p_2$ is typically at atmospheric pressure.

Applicable parameters such as pressures $p_1$, $p_2$ and temperatures $t_1$, $t_2$ on respective sides of the pig may be recorded and transmitted to the control unit 12 as sensor data B.

The invented system is particularly useful in monitoring one or more friction pigs placed at a location in a pipeline for the purpose of isolating a section of the pipeline. In order to gain the necessary degree of confidence that the friction pig is properly in place in pressure isolation operations, precise and real-time monitoring is necessary. Ideally, any change in the pig's position should be predicted before it actually moves.

As with any type of pigs or plugs, friction pigs will not move unless acted upon with a sufficient differential pressure. Because the static coefficient of friction almost always is higher than the dynamic coefficient, the friction pig will require a higher pressure differential across the pig to start the movement, than to keep it moving once it has been released.

Thus, any change in pressure differential $(p_1-p_2)$ across the friction pig is an indication that the pig is about start moving. Appropriate measures may then be taken when the control unit 12 detects such change.

Figure 2:
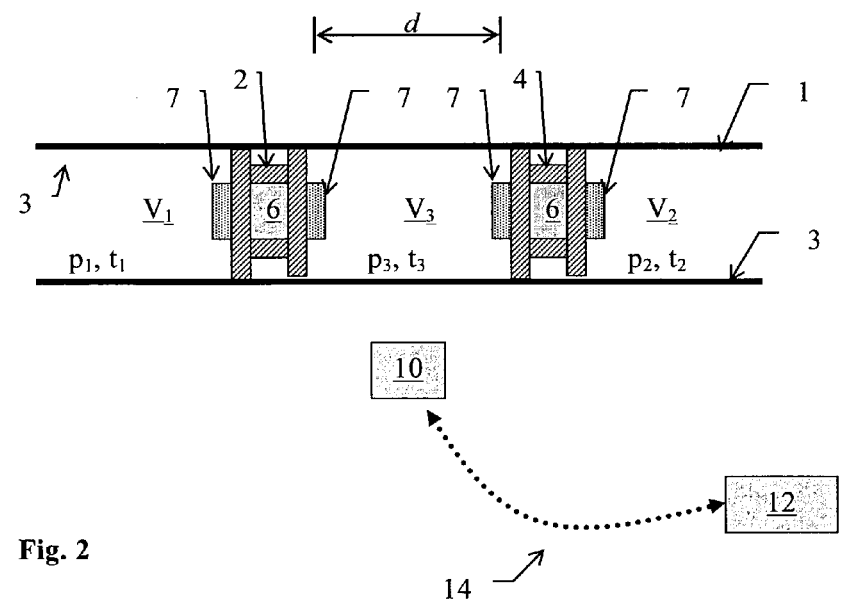
FIG. 2 is a schematic drawing illustrating a second embodiment of the system according to the invention.

In pressure isolation operations, several friction pigs are often used in order to provide a necessary redundancy. This situation is illustrated in FIG. 2, where a second friction pig 4 has been added next to the first friction pig 2, separated by a distance d and thus an intermediate volume $V_3$. In a typical application, the distance d may be in the region of 1 meters to 10 meters.

As in FIG. 1, $V_1$ denotes a pressurised volume having a first pressure $p_1$, while $V_2$ denotes a non-pressurised volume having a second pressure $p_2$, typically at atmospheric pressure. Other applicable parameters, such as first and second temperatures $t_1$, $t_2$ are also indicated.

Each pig 2, 4 is fitted with at least one first transponder 6, each of which is connected to at least one respective sensor 7. As the skilled person will understand, it will in most cases be sufficient to have a sensor 7 on the pressurised (upstream) side $V_1$, as the pressure $p_2$ on the non-pressurised side $V_2$ in principle may be recorded elsewhere within the pipeline.

By applying at least two separate pigs 2, 4 located a comparably short distance (d) from each other, as illustrated by FIG. 2, and by means of the sensor data B monitoring pressure and temperature changes over each pig as described above, the pressure differential over each pig will indicate if movement may be imminent, and provide forewarning to prepare accordingly.

The volume $V_3$ may also be monitored by means of optical sensors, ultrasound, etc. transmitted as sensor data B and/or calculated based on other parameters. Even small pig movements will be detected by evaluating the change in volume between the pigs.

The invented system has been described with reference to sensors communicating parameters such as pressure, temperature and volume. In addition, it is conceivable that the sensors 7 communicate parameters such as position, acceleration and travelled distance for the pig(s) 2, 4, as well as detection of gas leaking from the pressurised side of the pig.

The invention is particularly useful in the monitoring of friction pigs being used for pipeline isolation with comparably low differential pressures. By monitoring parameters which are descriptive of the pig and/or the conditions around the pig—examples of which are mentioned above—an operator is alerted of a potentially undesirable situation (e.g. pig movement) and is given the opportunity to take appropriate measures before the situation occurs.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A method for simultaneous monitoring of a pressure differential across a friction pig and a position of the friction pig to predict movement of the friction pig when the friction pig is in stationary use in and sealing against a pipeline, the friction pig having at least one pair of resilient sealing elements, the method further comprising the steps of:

using pressure sensors connected to the friction pig for acquiring data related to the differential pressure across the friction pig;

operating in different operation modes where one is a communication mode and the other is a tracking mode, the communication mode enables said pressure sensors for acquiring data related to the differential pressure and the tracking mode enables means for sending signals related to identification and position of the friction pig;

receiving instructions from a transponder of a remote control unit through a transceiver, said instructions comprises operation modes of the friction pig;

carrying out said instructions, and transmitting said acquired data and signals to said remote control unit through said transceiver, thus enabling simultaneous monitoring of the differential pressure across the friction pig and the position of the friction pig to predict movement of the friction pig; and predicting the movement of the friction before an movement occurs based upon a change in the differential pressure when the friction pig is in stationary use and sealing against the pipeline;

wherein the friction pig is a friction plug having no moving parts for use in pipeline isolation, the resilient sealing elements being the sole means of holding the friction plug in a stationary, sealing position within the pipeline.

2. A method according to claim 1 wherein one of the pressure sensors is located upstream of the friction pig, and another of the pressure sensors is located downstream of the friction pig.

3. A method according to claim 1 further comprising other sensors are sensors for measuring temperature, volume, axial position in the pipeline, acceleration, travelled distance in the pipeline or gas leaking through the friction pig.

4. A method according to claim 1 wherein the step for transmitting data comprises a transponder connected to the friction pig and configured for receiving data from the sensor, and a transceiver on the outside of the pipeline.

5. A method for simultaneous monitoring of a pressure differential across a friction pig and a position of the friction pig to predict movement of a plurality of friction pigs when in stationary use in a pipeline and sealing against the pipeline, the method comprising the steps of: positioning two or more mutually independent friction pigs into a stationary position, each having at least one pair of resilient sealing elements being the sole means of holding the friction pigs in the stationary position when in use in the pipeline and pressure sensors connected to at least one of the friction pigs for acquiring data related to differential pressure across the at least one friction pig, wherein the friction pigs are friction plugs having no moving parts for use in pipeline isolation; operating said friction pigs in different operation modes where one is a communication mode and another is a tracking mode, and where the communication mode enables acquiring data related to differential pressure across the at least one friction pig and where the tracking mode enables means for sending signals related to identification and position of each friction pig; receiving and carrying out instructions in the at least one friction pig from a remote control unit through a transceiver outside the pipeline, said instructions comprise operation modes of the friction pigs, transmitting said acquired data and signals to said remote control unit through said transceiver; thus enabling simultaneous monitoring of the differential pressure across the at least one friction pig and the position of the at least one friction pig to predict movement of the at least one friction pig; and predicting the movement of the at least one friction pig when the friction pig is in the stationary position and sealing against the pipeline.

6. A method according to claim 5 wherein the friction pigs are located 1-10 meters from each other.

7. A method according to claim 5 wherein one friction pig is master, and another friction pig is slave, and where the master friction pig comprises a transponder configured for receiving data from the sensors of the friction pigs, and for sending acquired data to the transceiver outside the pipeline.

8. A method according to claim 5 wherein one of the pressure sensors is located upstream, and another of the pressure sensors is located downstream of the set of friction pigs.

9. A method according to claim 5 further comprising another sensor for measuring at least one of a temperature, volume, axial position in the pipeline, acceleration, travelled distance in the pipeline or gas leaking through one or both of the friction pigs.

10. A method according to claim 1 wherein the remote control unit is not in communication with the sealing elements.

11. A method according to claim 5 wherein the remote control unit is not in communication with the sealing elements.

* * * * *